United States Patent [19]

Smith et al.

[11] E Re. 30,925

[45] Reissued May 11, 1982

[54] FUEL VAPORIZING COMBUSTOR TUBE

[75] Inventors: B. Clark Smith; Gene A. Anders, both of Peoria, Ill.

[73] Assignee: Caterpillar Tractor Co., Peoria, Ill.

[21] Appl. No.: 202,386

[22] Filed: Oct. 30, 1980

Related U.S. Patent Documents

Reissue of:

[64] Patent No.: 4,188,782
Issued: Feb. 19, 1980
Appl. No.: 860,644
Filed: Dec. 14, 1977

[51] Int. Cl.[3] ..... F02C 7/22
[52] U.S. Cl. ..... 60/733
[58] Field of Search ..... 60/738, 740, 749

[56] References Cited

U.S. PATENT DOCUMENTS

| | | | |
|---|---|---|---|
| 2,522,081 | 9/1950 | Allen | 60/738 |
| 2,595,765 | 5/1952 | Clarke et al. | 60/738 |
| 3,430,443 | 3/1969 | Richardson et al. | 60/738 |
| 3,579,983 | 5/1971 | Carvel et al. | 60/738 |
| 3,913,318 | 10/1975 | Fox et al. | 60/738 |
| 3,952,503 | 4/1976 | Fox et al. | 60/738 |
| 4,085,581 | 4/1978 | Carvel et al. | 60/738 |

FOREIGN PATENT DOCUMENTS

| | | |
|---|---|---|
| 2312654 | 5/1975 | France . |
| 603485 | 6/1948 | United Kingdom . |
| 1253471 | 11/1971 | United Kingdom . |
| 1357533 | 6/1974 | United Kingdom . |

*Primary Examiner*—Robert E. Garrett
*Attorney, Agent, or Firm*—Richard F. Phillips

[57] ABSTRACT

In a fuel vaporizing type of combustor for gas turbines, using fuel vaporizing tubes and associated mechanism, the vaporizing tubes having a construction and configuration adapted to maintain uniform temperatures therein, the structure as well maintaining uniform temperatures in the head plate of the unit and in an associated splash plate, if used, the structure further tending to eliminate carbon build-up within the tube per se. The vaporizing tubes have a direction of vapor discharge disposed at an angle from the tube stem axis so as to direct the vapor stream to the side and away from the stem base, thereby to minimize formation of localized hot spots and head plate and/or splash plate damage; the interior of the vaporizer tubes being smoothly flow contoured to eliminate eddies and flow losses and thereby prevent localized hot spots therewithin; the vapor tubes having non-uniform wall thickness serving not only to prevent areas of carbon build-up but also localized hot spots; splash plates, when used, being designed to so act with respect to the discharge flow as to reduce the total temperature spread in the head plate and/or splash plate; the splash plate configuration shielding the head plate from the hot vapor discharge from the tubes.

28 Claims, 8 Drawing Figures

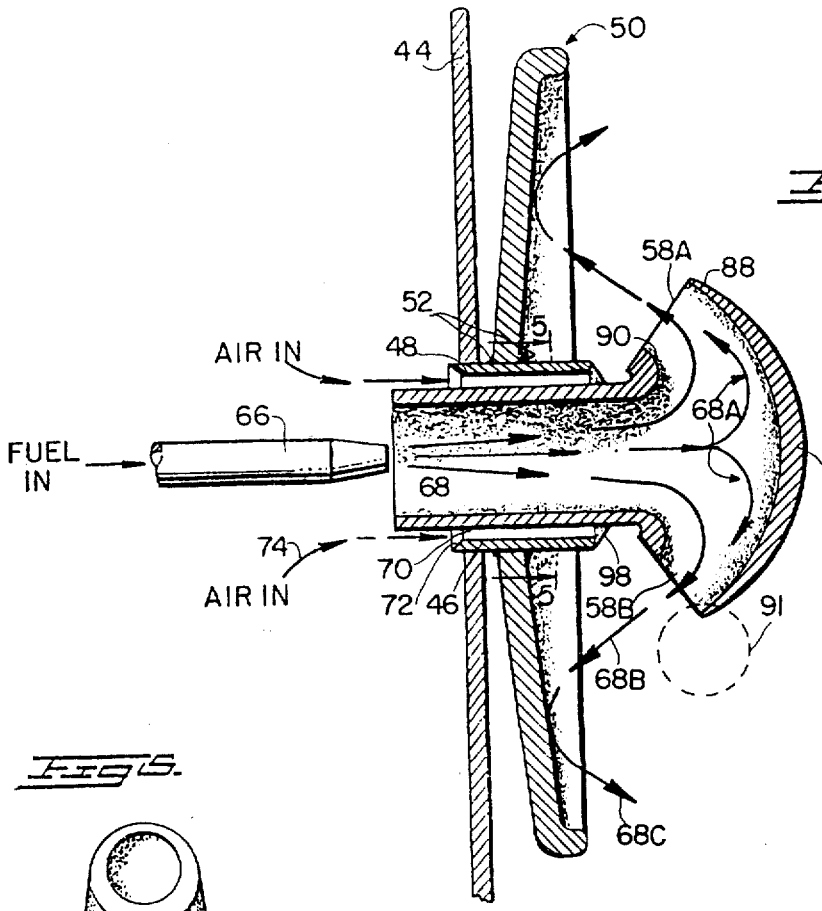
Fig 4.
Fig 5.
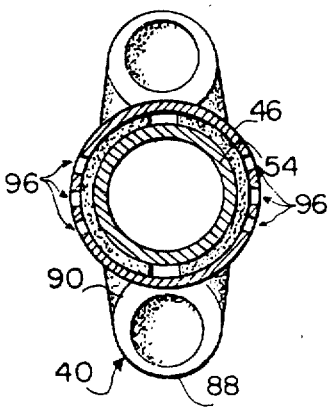
Fig 6.
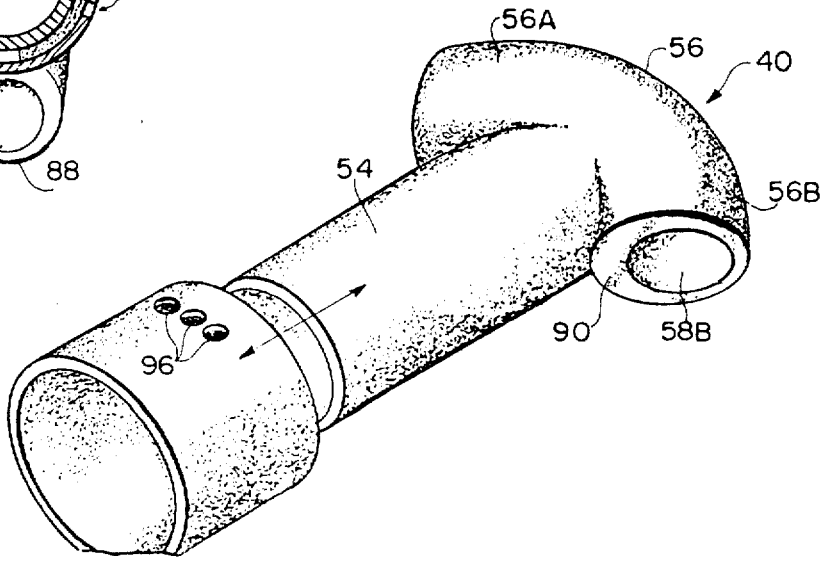

FUEL VAPORIZING COMBUSTOR TUBE

Matter enclosed in heavy brackets [ ] appears in the original patent but forms no part of this reissue specification; matter printed in italics indicates the additions made by reissue.

BACKGROUND OF THE INVENTION

The present invention relates generally to vaporizing type combustors, for use in gas turbines, as differentiated from an atomizing type. When functioning properly, a vaporizing type combustor normally tends to operate with less soot generation than do the atomizing types. In attempting to prevent premature plugging of heat exchangers for such apparatus, it has been found desirable to use the vaporizing type of combustors, especially in gas turbines which use either regenerators or recuperators.

Vaporizing type combustors previously have used fuel vaporizing tubes, and known types have included a so called "candy cane type" or a so called "T-type," the "T-type" being a double armed candy cane type. Examples of such vaporizing tubes are found in the prior art, including, but not limited to, U.S. Pat. No. 3,757,522 which discloses a T-type vaporizer tube; British Pat. No. 1,253,471 which also discloses a T-shape; and additional examples are disclosed in U.S. Pat. No. 4,030,288, the latter patent being owned by a common assignee with the present application; and U.S. Pat. No. 3,913,318. Other similar structures have heretofore been used.

Problems exist with such vaporizing tubes however, including, for example, a burning out of portions of the vaporizer tube due to localized high temperatures or hot spots; burning out or thermal fatiguing of head plates or splash plates, if the latter is used. Additionally carbon may form in various parts of the vapor tube per se, if such parts are too cool in operation, or on parts of the head plates or splash plates. Under such circumstances, if conditions change, the built up carbon may break away and cause erosion; or localized hot spots may form if such carbon begins to burn; or flow may become adversely affected by being impeded; or the carbon may act as an insulator and thus increase the severity of thermal stresses in various parts.

In a significant percentage of prior known and used vaporizing tubes of the candy can type, there is a full reversal of the flow direction, with the discharge of the vapor being in a direction opposite to the flow into the vapor tube. The flow turns in such prior art apparatus have in some instances been purposely made sharp, as by use of mitered joints and the like, in order to create eddies and a purported better mixing of vapor with the air. This type of construction and resulting operation, however, have been found to be undersirable in that such eddies tend to increase residence time of the fuel and air mixture at certain locations, and if ignition occurs within the tube, for example, a local hot spot can be rapidly formed, which can lead to a burn out or local melting.

Basically the present invention has as a partial object a vaporizing tube for use in vaporizing type combustors, with the tube having structure and design which serve to maintain more uniform temperatures in the vaporizing tube, as well as in a splash plate, if used, or the head plate. Additionally, the design is such as to eliminate, in so far as possible, carbon build-up within the vapor tube itself, or on other areas of the apparatus, and generally to eliminate existent defects and drawbacks of the prior art.

DESCRIPTION OF THE PRIOR ART

Heretofore fuel vaporizing tubes of a type generally referred to as "candy cane type" or "double candy cane type," the latter being a T-type, have typically used a full reversal of direction flow in that the vapor discharge was in a direction opposite to fuel and compressed air flow into the vapor tube, and the flow turns have frequently been purposely made sharp, using mitered joints, in order to create eddies with the purpose in mind of a better mixing of the vapor with the air. Drawbacks in use resulted. The fully reversing feature, as well as sharp bends in a T-type, or double candy cane, are shown for example in U.S. Pat. No. 3,913,318, FIGS. 3, 4 and 5 thereof, and even with the construction of FIG. 4, generally referred to as a mushroom type, the annular outlet is in a plane perpendicular to the center line of the inlet tube so that, in effect, the discharge plane is perpendicular to the center line of the inlet tube.

Similar constructions, with the same problems and drawbacks are to be found in U.S. Pat. No. 3,757,522 and British Pat. No. 1,253,471.

In these prior typical candy cane type vaporizing tube constructions, which use a full reversal of flow, and especially where the turns are purposely made sharp, the so created eddies, and impediment to flow, tend to increase residence time of the fuel and air mixure at any single location and, if ignition occurs within the tube, a local hot spot is rapidly formed, which leads to a burn out, or local melting. Burning out of portions of a tube, due to localized high temperatures which prevail under certain operating conditions, and additionally burning out or thermally fatiguing the head plate, or splash plate if the latter is used, are problems which it is desirable to eliminate.

It has also been found that in poorly designed vaporizing tubes of the type in question carbon may form in various parts of the vapor tube itself, if such parts are or become too cool, or even on parts of the head plates of splash plates. As pointed out hereinbelow, if and when conditions change, such carbon may either break off, or cause unnecessary erosion, or localized hot spots may form if such carbon begins to burn, or flow may become affected, or, finally, the carbon may act as an insulator, thus increasing the severity of thermal stresses in parts.

It is accordingly a primary object of the present invention to provide a vaporizing tube having a construction and configuration which in and of itself, as also associated mechanism in a gas turbine, serve to overcome the drawbacks and problems existent in prior known structures, and to provide a superior operating unit.

SUMMARY OF THE INVENTION

The present invention accordingly is directed generally to a fuel vaporizing type of combustor for gas turbines, and more specifically to a vaporizing tube design and associated mechanism which eliminates drawbacks and problems existant in prior known constructions.

A gas turbine engine of a type which the present invention is directed toward improving, is shown in U.S. Pat. No. 4,030,288, assigned to a common assignee with the present application. Only so much of the structure, shown in greater detail in that patent, will be incorporated in the present application as needed to serve as a basis for disclosing and describing the present invention and features thereof, reference being had to the aforesaid patent for details, the patent being incorporated herein by reference to that end.

The present invention is in one aspect aimed at maintaining more uniform temperatures in vaporizing tubes of a type generally referred to as a "candy cane" type or "double candy cane type" which latter is of a T-configuration, and as well in a splash plate if used, or a head plate in a gas turbine construction. The present invention also has an object of significance the elimination, to the extent possible, of carbon buildup within the vapor combustion tube itself.

Generally speaking therefore, the present invention significantly improves upon the present known state of the art as reflected, for example, in the previously referred to patents. It has been found that eliminating the fully reversing feature of the prior art, in conjunction with an aerodynamic shaping or configuring of the interior tube design, and a varying of the wall thickness of a vapor combustor tube in certain areas, all contribute to overcome many of the problems existant in the prior art.

It has also been found that if a splash plate adapted for use with the invention has a particular shape or configuration, then it serves to effectively shield substantially the entire head plate from the hot discharge from the vapor tubes. The splash plate shape and arrangement are also designed to compensate for the positionment of the discharge streams from the vapor tube with respect to the annular burner as used in turbine constructions.

With the invention prior art temperature variations at the head plate or splash plate of, for example, 600° F., or even more, can be reduced to approximately 300° F. or less, by making the discharge angle of the vapor stream at an angle in the range of, for example, 20–55 degrees from the vertical. In specific instances a preferred angle may be close to 35°, as distinguished from the 0° arrangement of the prior art utilizing the fully reversing type. This angular disposition is applicable to both single and double candy cane types.

The present invention uses an interior design of the vaporizing tubes according to accepted aerodynamic shapes, which in effect are of a free and unimpeded flow configuration, and this is conducive to minimizing the formation of eddies, and further minimizes flow losses. Due to this, localized hot spots are to a great extent prevented, because at no time or place do the eddies of stoichiometric mixtures of fuel with air form, and persist, for any appreciable length of time. This distinguishes from the so called sharp angled or "mitered" approach.

Providing smooth internal passages in the design and, additionally, leg areas smaller than stem areas, are beneficial in eliminating flow recirculation and stagnation areas, which otherwise would contribute to torching at the discharge orifices, and to local internal carbon deposits. The torching at the vapor tube exit during deceleration, for example, can locally warp and crack a headplate in the absence of other protective measures.

The present invention teaches a vaporizer tube construction wherein wall thickness is not uniform throughout, but is thicker at the top where the flow is angled in a somewhat reversed direction, and the wall thickness is also greater at the inner radius where the discharge arms are integrated with the tube stem. The thickened wall area at the top is provided in order to increase or raise temperature in the tube at that location above a carboning temperature, it having been found that tubes under some conditions run too cool at the top, with a resulting contribution to formation of carbon. The increased thickness at the inner radius prevents a sharp reentrant curve, or cavity, which also tends to build up carbon. As a practical matter these vaporizer tubes are cast, and elimination of the sharp bend at the inner radius facilitates proper casting and an improved end article.

While the presence of a splash plate itself is not new, splash plates being taught for example in British Pat. No. 1,253,471. The construction in that patent is of a fully reversing type, and the splash plates used therein are circular in shape. The present invention on the contrary utilizes a splash plate configuration which is more or less rectangular, with rounded corners and upturned edges, providing a dished configuration for stiffness, the end result tending to reduce the total temperature spread in a head plate and splash plate as well. The splash plates of the present invention serve to effectively shield the entire head plate from the hot vapor discharge from the tubes and eliminate high headplate temperatures.

In partial summary therefore, features of the present invention which constitute a substantial improvement over the prior art deal with elimination of localized hot spots on either the head plate or the splash plate, if used, by discharging the vapor stream or flow from the vaporizer combustor tube somewhat to the side and away from the base of the tube, rather than directly backward or in the full reverse type of flow. The invention also eliminates local hot spots within the vapor tube by creation of a smoothly contoured flow path, which is streamlined in accordance with accepted aerodynamic flow patterns. Additionally the tube wall thickness is varied to minimize problems resulting from undersirable temeprature variations and tendencies to accumulate build up of carbon deposits. To more effectively shield the head plate from the vapor streams, the splash plates at each vapor tube are made non-circular, and are of a more or less rectangular shape and provide a greater and more effective coverage of the impingement region or area of the vapor stream.

The foregoing features serve separately, and additively in combination, to provide a substantial improvement in the art of vaporizing types of combustors for use in gas turbines.

Additional objects, features, and advantages of the invention will be more readily apparent from the following detailed description of an embodiment thereof, when taken together with the accompanying drawings in which:

FIG. 4 is a fragmentary view, with a detailed section of the combustor tube and associated air shroud and splash plate, air and fuel, and vapor, flow being depicted by arrows therein, the view being taken along line 4—4 of FIG. 3;

FIG. 5 is a detailed sectional view taken along line 5—5 of FIG. 4 and disclosing anti-carbon holes in the shroud;

FIG. 6 is an exploded perspective view of a double vapor tube construction, and associated air shroud;

Figure 7:
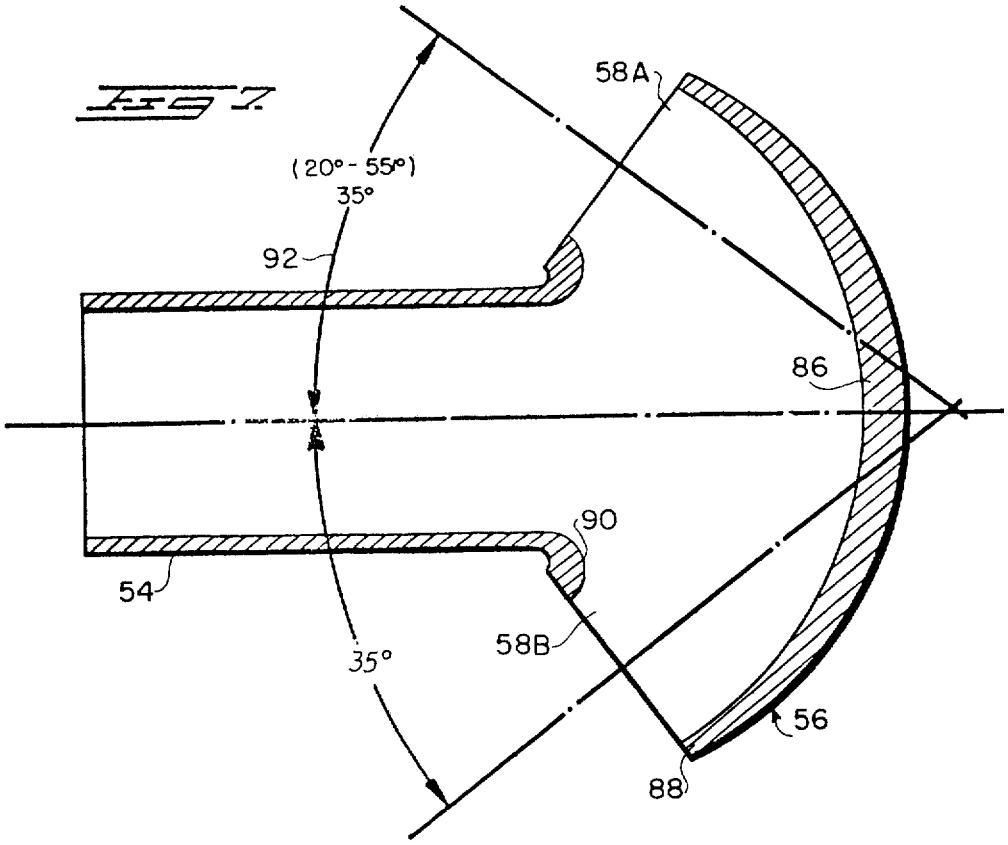
Figure 8:
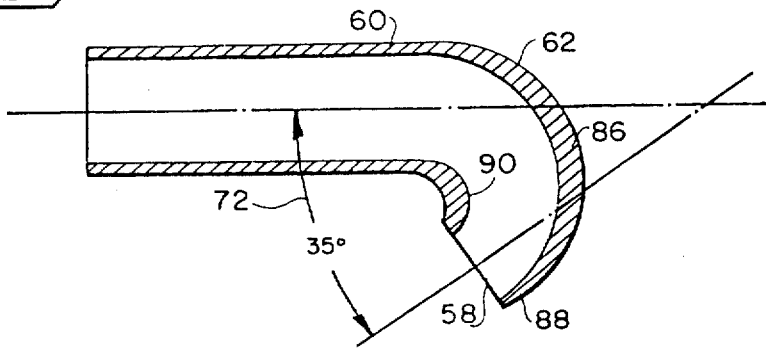

FIG. 7 is an enlarged, schematic, cross-sectional view through a head portion of a vapor tube disclosing in greater detail regions or areas of varied wall thickness, and the angular disposition of the discharge outlets, and defined vapor flow paths; and FIG. 8 is a view similar to FIG. 7 of a single flow path tube arrangement, as distinguished from the double construction of FIG. 7, but showing similarity in disclosed features.

Figure 1:
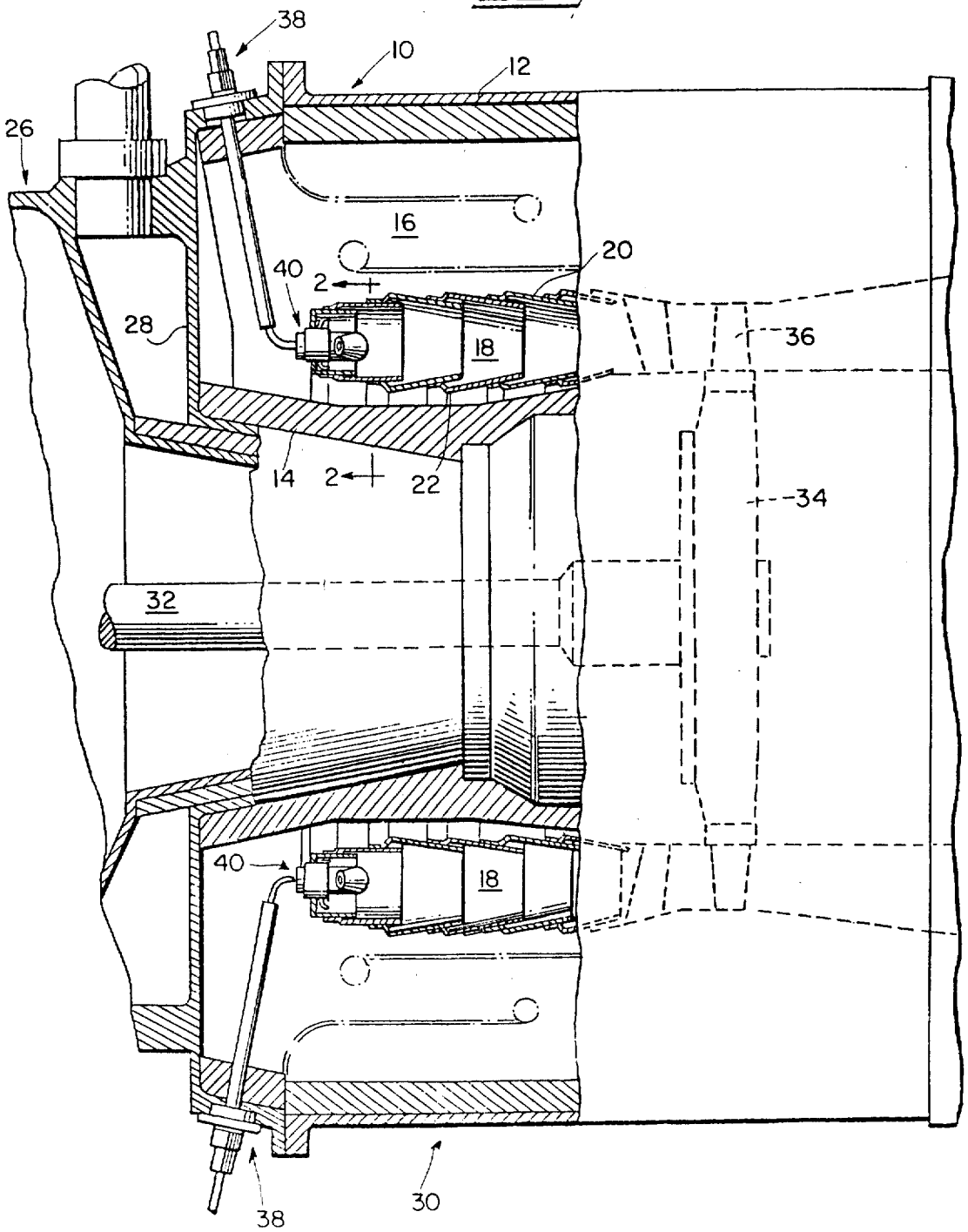
FIG. 1 is a fragmentary elevational view of a portion of a vaporizing type gas turbine, partially broken away, and showing vaporizing combustor tubes within the annular burner.

Referring now in detail to the drawings, there is shown in FIG. 1 only such portion of a gas turbine construction as necessary to serve as a setting for an explanation and understanding of the present invention. Reference is here again made to U.S. Pat. No. 4,030,288, assigned to the assignee of the present application, for a more complete and detailed showing of a turbine of the type as shown in FIG. 1. Basically, however, a gas turbine generally designated 10 includes an outer case 12 and an inner case 14 which, as is usual, are substantially coaxial and define therebetween an annular chamber or space 16 within which an annular burner or combustion chamber 18 is mounted. As is usual, the annular burner includes an outer wall 20 and an inner wall 22. Additionally, as is usual, a compressor passage leads from the compressor section, generally designated 26. An end wall or cap 28 is provided at the end of the gasifier section or module generally designated 30. A shaft 32 extends through the compressor passage, and leads to a compressor section and mechanism therein, not shown. The opposite end of the shaft carries a gasifier turbine wheel generally designated 34 with the usual blades 36. The foregoing is of a known construction, as evidenced in the aforesaid patent.

The annular burner 18 has, as is usual, a plurality of fuel inlets or tubes, the overall units being designated 38, and which are spaced annularly and functionally to introduce fuel into the vaporizer tubes of the invention generally indicated at 40. The fuel inlets and the vaporizing tubes are spacedly positioned with respect to annular burner in a known manner, and which can be seen from FIG. 2 of the drawings showing a fragment of the annular burner and vaporizer tubes 40 therein.

Figure 3:
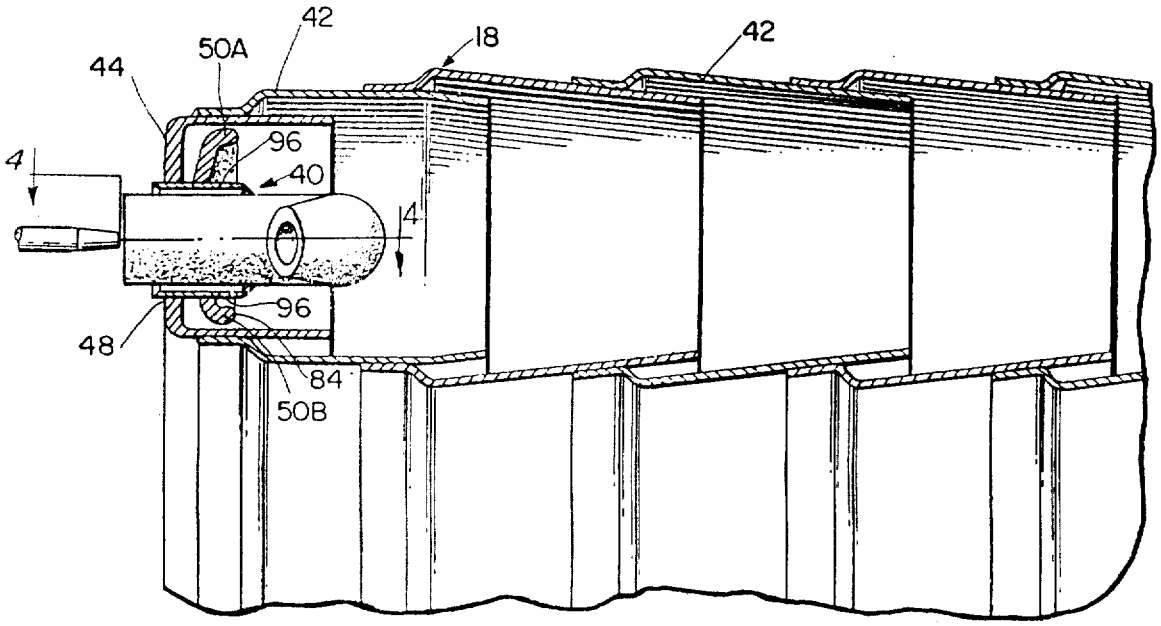
FIG. 3 is a fragmentary detailed sectional view taken along line 3—3 of [FIg. 2] *FIG. 2;*

The annular burner 18 includes a plurality of sections 42 and a head plate 44 with a plurality of openings for positionment of the multiple vaporizing tubes and associated mechanisms. The head plate is associated with the annular burner as shown in FIG. 3. Operatively positioned within the openings are the vaporizing tubes 40, and associated mechanisms, including for each surrounding and spaced shroud 46 which is mounted within openings 48 [i] *in* the head plate, with the shroud being attached to the tube as appears hereinafter. The apparatus further includes splash plates 50 associated with the tubes and shrouds, FIG. 4, the splash plates having openings through which the shrouds extend, with the tubes positioned therewithin. The shrouds and splash plates are connected by welding at 52, the welds extending continuously around the interconnection lines between the shrouds and splashplates.

The vaporizer tubes 40 include a stem portion 54 and a head portion generally indicated at 56. This head portion 56 includes, in one embodiment, two transverse leg portions 56A, 56B terminating in partly vapor stream reversing vapor discharge openings 58A, 58B. This particular configuration including two leg portions extending in opposite directions, is referred to as a "double candy cane," or a "T." In some installations only a "single candy cane" is used. Such a construction is shown in FIG. 8, which includes a stem 60, and a single head portion 62, with a discharge orifice 58. This form is in the nature of an inverted "J".

A fuel injector or tip portion 66 extends from the fuel inlet, generally indicated at 38, for introduction of fuel into the vaporizer tube as indicated by arrows 68. The shrouds 46, as indicated previously, are spaced from the exterior of the stem portions 54 of the tubes 40, as shown in FIG. 4, i.e., the outer diameter of the stem is smaller than the inner diameter of the shroud. This construction provides an air channel 70, with a beveled or tapered inlet end 72, and air for cooling and admixture with fuel in the annular burner is introduced as indicated by arrows 74. The present invention contemplates a plurality of these fuel vaporizers for use in fuel vaporizing types of combusters for use in gas turbines, incorporating or using two or more of the vaporizing tubes located substantially equidistantly in the annular type of combustor. The number can of course vary according to the construction and operational characteristics desired.

Figure 2:
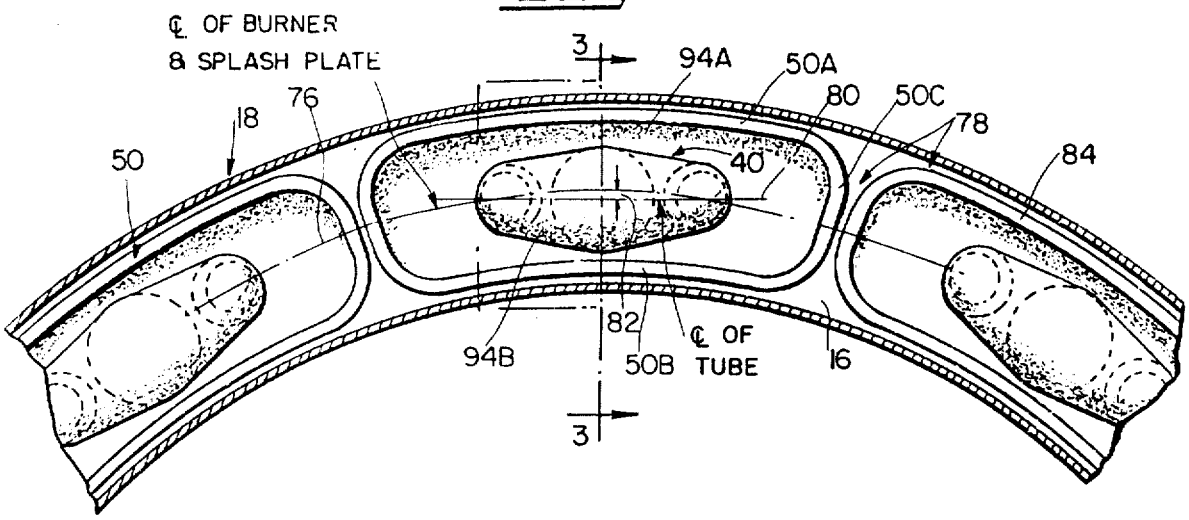
FIG. 2 is an enlarged fragmentary sectional view taken along line 2—2 of FIG. 1.

Referring now to FIGS. 2 and 3, the positionment of the vaporizer tubes with respect to, or in conjunction with, the splash plates, and their association or positionment within the annular burner is illustrated. In FIG. 2 the center line of the annular burner is indicated by the broken line at 76. This is of course circular and in order to prevent damage to the head plate 44, and generally to control the dissemination of heat, the splash plates 50 have generally rectangular, but curvilinear configuration, matching the shape of the annular burner, with curvilinear outer and inner edges 50A, 50B respectively. The ends 50C of the splash plates are disposed at an angle more or less conforming to radii of the annular burner so as to permit appropriate fit of one with another. The splash plates 50 are spacedly arranged within the annular burner, the spacing extending around each as shown at 78, and in one particular embodiment a clearance of 0.050" minimum is provided on all sides of the splash plates. This permits a flow of air and medium within the annular burner, and about the plates with respect one to another, but is sufficiently large as to not create a pressure drop.

The configuration of the "double candy cane" vaporizing tube construction has a rectilinear center line, shown at 80 in FIG. 2. For optimum performance, including heat containment and area of impingement, it is desirable to have the centers of the vapor discharge openings of the vaporizing tubes coincide with the center line of the splash plates, the latter being coincident with the center line of the annular burner. A correction is therefore required by displacing center line 80 of the vaporizer tube from the curvilinear center line 76 of the annular burner and splash plates. This results in an offset disposition of the splash plates with respect to the vaporizer tubes and shrouds associated therewith. The amount of offset is indicated in FIG. 2, i.e., the space 82 between the arrows. This offset arrangement is also seen in FIG. 3, and places the centers of the reverse nozzles, or vapor streams emitted therefrom, on the center line of the splash plates, making the nozzle openings coincident with the center line of the splash plates.

In other words, the vaporizer tube outlets are centered over, and are coincident with, the center line of the splash plates so as to have better containment of the vapor streams and heat on the splash plates.

The configuration and construction of the splash plates, i.e., a more or less slightly curved rectangular, configuration with rounded corners, in conjunction with upturned edges, generally designated 84, further serves to reduce the total temperature spread in the head plate, and the splash plate as well. The upturned edges additionally serve as stiffening and strengthening means for the splash plates, and the splash plates as arranged and configured effectively shield the entire head plate from the hot discharge from the vaporizing tubes, thereby eliminating high head plate temperatures. In this connection, as has been pointed out, minimum clearance in the neighborhood of 0.050 inches is maintained on all sides of the splash plates with respect to structure positioned adjacent thereto. The gaps between the splash plates and annular burner walls are such as to provide an air velocity low enough to minimize pressure loss, but high enough to prevent flame propagation. A gap sizing in one practical embodiment, for example, was such as to provide for a 90 ft./sec. air velocity. It is also to be noted that the splash plates are free to expand in any direction. The splash plate combustor approach of the invention in effect provides individual vaporizing surfaces for each tube, and shields the head plate from the flame.

The configuration of the vaporizer tubes, and their construction, have been carefully designed in order that local hot spots are eliminated, and this incorporates at least two factors. Generally speaking, the vaporizer tube construction is such that wall thickness is not uniform throughout, but is thicker at the top where the air flow is directionally initially angled in a somewhat reversed direction, and the wall thickness is also greater at the inner radius where the discharge arms are integrated with the tube stem. The thickened wall area at the top is provided in order to increase or raise temperature in the tube at that location above a carboning temperature, it having been found that tubes under some conditions run too cool at the top, with a resulting contribution to formation of carbon. The increased thickness at the inner radius prevents a sharp reentrant curve, or cavity, which also tends to build up carbon. It will be seen that the central head portion of the tubes, i.e., at a point opposite the outlet end of stem 54, is thickened, the tube material being thicker at 86, and then gradually tapering to thinner edges 88 at the outlet orifices or discharge openings 58. Additionally the inner radius 90 of the tube heads is thickened to prevent a sharp reentrance curve or cavity. It is desireable to maintain a temperature above 1000° F., below which carboning tends to occur, and below 1450° F., since a higher temperature tends to decrease sulphidation life.

The interior of the vaporizing tubes is significantly designed according to accepted aerodynamic principles and shapes, conducive to a minimized amount or formation of eddys, and minimum flow losses. In effect the tube interior provides a free [andunimpeded] *and unimpeded* flow path configuration. Providing smooth internal passages in the design and, additionally, leg areas smaller than stem areas, are beneficial in eliminating flow recirculation and stagnation areas, which otherwise might contribute to torching at the discharge orifices, and to local internal carbon deposits. Torching at the vapor tube exit during deceleration, for example, additionally can locally warp and crack a headplate in the absence of other protective measures.

It has been found that the structural details of the invention further additively contribute to prevent the [formatio] *formation* of localized hot spots, [snce] *since* at no time or place do eddies of stoichiometric mixtures of fuel with air form and persist for any appreciable length of time. This construction is contary to the so called "mitered" approach. The non-uniformity in wall thickness of the vapor tubes, i.e., the thicker wall region at the center of the head serves initially to raise the temperature at this top portion of the head since normally tubes run too cool at the top, and thereby contribute to the formation of carbon. The thickened inner radius eliminates a sharp curve which might also tend to build up carbon. Vaporizing tubes which can be cast, a desireable feature, are also facilitated by the thickened inner radius.

As pointed out, it was found that in prior art constructions, such as for example the mitered and fully reverse flow types, temperature variations at the head plate or the splash plate could be quite high, and for example inthe neighborhood of 600° F. An extremely important feature of the present invention resides in being able to reduce this to approximately 300° F. or less by provision of a discharge angle of the vapor stream, not at a fully reverse angle, but one in the range of, for example, 20° to 55° from the vertical this angle 92 being shown in FIGS. 7 and 8, the angle range being designated within the parenthesis, and in specific instances this preferred angle may be close to 35°, also as indicated. This angular disposition is the same for either the double or single "candy [cane[] *cane*" constructions of FIGS. 7 and 8 respectively. It is also of significance that the discharge plane is substantially at 90° to the center line of the discharge orifice, the center line varying between 20° and 55° from the vertical as above set forth.

The disposition of the outlet orifices, in conjunction with the other features of the vaporizing tubes and associated mechanism, add to the overall efficiency of the invention. Fuel, with some air, is introduced into the bottom of the tubes as indicated by arrows 68, the mixture the flowing toward the inner surface of the tube head, while being subjected to heat surrounding the tube with resultant partial vaporization, the flow then being smoothly turned about at a partly reversed angle, as shown by arrows 68 A, with the flow exiting through the outlet orifices in a flow path shown by arrows 68 B. This flow path, or defined flow stream, is directed toward toward the splash plates at a position spaced or removed fromthe base of the tube steam base. At the point of exit of the vapor stream there can be a further mixing with additional air, indicated by the circle at 91, some of which enters through air channel 70, and exits through the partially open upper end of shroud 46. The vapor streams impinge on the splash plates, the fuel being further vaporized, if not already in a state of substantially complete vaporization, and the mixture is then directed as indicated by arrows 68 C into the annular burner wherein the combustor functions in a usual manner.

The combined effects of discharging from the vapor tube, not directly backward or fully reversed, but somewhat to the side and away from the base of the vapor tube, and the feature of the splash plates at each vapor tube being made non-circular, but more or less rectangular, and being so positioned by the off center arrangement that the direct impingement of the vapor stream is received by the splash plates are important to the achieved results. The angular disposition, and cooperation with the splash plates, eliminate substantially any carbon build up or localized hot spots on either the head plate or the splash plate by discharged vapor. It has been found under some circumstances, however, there is a tendency to build up carbon deposits along side edges of the splash plates, indicated at 94A and 94B. In order to eliminate this, the shrouds 46 have a plurality of anti-carbon holes 96 therein, so oriented that air [emtering] *entering* the shrouds, as indicated by arrows 74, is discharged through the holes and impinges upon the areas 94A, 94B of the splash plates, and by an air wiping or knocking-off action tends to eliminate a carbon build up in this area. The upper ends of the shrouds being welded to the exterior of the vaporizer tube stem, as indicated at 98, care must be taken not to close or interfere with the anti-carbon holes when welding. The welding is discontinued, at least intermittently, under the legs 56A, 56B to permit additional air flow for mixing and for stem cooling. The shroud at its lower end is spaced from the vapor tube and is tack welded, thereto for example, at three places. A larger number of anti-carbon holes can be incorporated in the shroud and, for example, the shroud may have twelve holes equally spaced thereabout, rather than the three on each side as shown in the drawings.

As regards the single candy cane construction of FIG. 8, all of the characteristic features of the embodiment of FIG. 7, as discussed in detil, are incorporated herein. This includes the thickened tube head end at 86, the thinner edge at 88, and the thickened reverse angle area at 90. A splash plate similar to that used with the double "candy cane" can be used with the single "candy cane," cost factors involved indicating use of identical plates, with an end thereof being inoperative.

It will be readily understood from the foregoing that the present invention constitutes a substantial improvement over the prior art, with features dealing with elimination of localized hot spots on either the head plate or the splash plate, if used, by discharging the vapor stream or flow from the vaporizer tube somewhat to the side and away from the base of the tube, rather than directly backward or in the full reverse type of flow. The invention also eliminates local hot spots within the vapor tube by creation of a smoothly contoured flow path, which is streamlined in accordance with accepted aerodynamic flow patterns. Additionally the tube wall thickness is varied to minimize problems resulting from undesirable temperature variations and tendencies to accumulate build up of carbon deposits. To more effectively shield the head plate from the vapor streams, the splash plates at each vapor tube are made non-circular, and are of a more or less rectangular shape and provide a greater and more effective coverage of the impingement region or area of the vapor stream.

The foregoing features serve separately, and additively in combination, to provide a substantial improvement in the art of vaporizing types of combustors for use in gas turbines.

While preferred embodiments of the invention have been herein shown and described, manifestly minor changes and modifications can be effected without departing from the scope and spirit of the invention as defined in and limited solely by the appended claims.

I claim:

1. A continuous fuel vaporizer tube *assembly* adapted for use in a vaporizing type combustor, said tube including a hollow stem portion with an open end base, a head portion atop said stem and including a hollow leg portion extending laterally from said head portion, the hollow interiors of said stem portions, said head portion, and said leg portion constituting a continuous closed duct with a smooth continuous flow path contour therethrough, said leg portion terminating in a vapor discharge orifice disposed at an acute angle to the axis of said stem portion, and operable to direct the path of a discharged vapor stream at an acute angle away from said stem and thereby displace the vapor stream path away from the base of said stem[.], *the vapor stream impinging upon a plate.*

2. A fuel vaporizer tube *assembly* as in claim 1, said combustor being of an annular type for use in gas turbines.

3. A fuel vaporizer tube *assembly* as in claim 1, said combustor being a can type.

4. A vaporizer tube *assembly* as claimed in claim 1, said acute angle being within the range of between approximately 20° to 55° from the longitudinal centerline of said tube whereby the path of vapor discharge is reversed from the direction of fuel-air mixture flow through said tube at an angle in the range of between 125° to 160°.

5. A fuel vaporizer tube *assembly* as claimed in claim 1, said tube being generally of an inverted J shape, the J including the stem portion with an open end base, and head portion atop said stem and including said leg portion extending laterally from said head portion.

6. A fuel vaporizer tube *assembly* as claimed in claim 1, said tube being generally T-shaped, the T including the stem portion with an open end base, and head portion atop said stem and including leg portions extending laterally from opposite sides of said head portion.

7. A fuel vaporizer tube *assembly* adapted for at least partially vaporizing a composite fuel passing therethrough into a burner of a turbine, fuel and air composite being mixed within said tube and being at least partially vaporized therein, with the so mixed composite fuel, air in vaporized state being discharged as a vapor stream for combustion in the burner, said tube including a hollow stem having a base and a head and defining a smooth contoured longitudinal flow passage therethrough, a hollow transverse leg operably connected with and extending from said head and having a smooth contoured flow passage therethrough and operably connected to said longitudinal flow passage with a smooth curvilinear juncture therebetween and constituting a continuation thereof, said leg having a vapor stream discharge orifice at the free end thereof, said leg being disposed at an acute reverse angle to the longitudinal axis of said stem whereby the path of the discharged vapor stream is directed in a partially reversed direction, with respect to said longitudinal flow passage with the path being resultantly spaced from the stem base whereby the stem base, and the area immediately adjacent thereto, are in a region removed from direct impingement by the heated combustion gases of the vapor stream, the smoothly flow contoured and continuous interiors of the tube tending to eliminate eddies and flow losses therein, and preventing localized hot spots therewithin, said vapor tube having a non-uniform wall thickness with resulting temperatures therein serving to prevent areas of carbon build up and localized hot spots, splash plates positioned to intercept the angled discharged vapor stream and having configuration and dimension shielding associated turbine burner components from the hot vapor discharge from the tubes.

8. A fuel vaporizer tube *assembly* as claimed in claim 7, wherein a said tube is operably mounted within an annular burner of a turbine, with the base of said stem operably mounted with respect to and through a head plate of the burner, said splash plate being operatively associated with and extending around said stem proximate the base thereof and positioned between said discharge orifice and head plate and being of such shape, size and configuration as to substantially intercept the discharged vapor stream to thereby reduce the total temperature spread in said head plate and shield said head plate from the hot vapor discharge.

9. A fuel vaporizer tube *assembly* as claimed in claim 8, wherein said splash plate is of a longitudinally curvilinear extended rectangular shape commensurate with the curvilinear shape of said annular burner and is uniformly spaced a small distance from the sidewalls thereof.

10. A fuel vaporizer *tube assembly* as claimed in claim 9 wherein said splash plate has rounded corners and a surrounding upturned peripheral edge thereon providing increasing stiffness and serving to peripherally confine vapors from the discharge stream impinging thereon.

11. A fuel vaporizer *tube assembly* as claimed in claim 10, wherein a plurality of said vaporizer tubes are operably mounted in said burner in spaced relationship thereabout between the annular sidewalls thereof, the ends of said splash plates being spaced from one another a distance substantially equal to the spacing between the longitudinal edges of said splash plates and said sidewalls of said tubular burner, the spacings being such as to substantially intercept the hot discharge vapor streams from said vaporizer tubes, thereby to effectively shield the entire head plate and to minimize heat effect on said heat plate, the spacings being sufficiently small to prevent undesirable pressure drops in the burner.

12. A fuel vaporizer tube *assembly* as claimed in claim 8, further including a shroud positioned about said stems proximate the base thereof and in radially spaced relationship therewith, said shroud extending below and above said head plate, the spacing of said shroud and said stem providing an airflow channel therebetween adapted for compressed air introduction and partial flow for additive mixing with the vapor stream discharge from said tube, and cooling of said tube stem, said shroud having anti-carbon holes therethrough at a position substantially aligned with the shorter dimension of said splash plate for air flow therethrough to impinge the upper surface of the splash plate to air wash carbon particles therefrom.

13. A fuel vaporizer tube *assembly* adapted for use in a vaporizing type combustor, said tube including a hollow stem portion with an open end base, a head portion atop said stem and including a leg portion extending laterally from said head portion, said leg portion terminating in a vapor discharge orifice disposed at an acute angle to the axis of said stem portion, and operable to direct the path of a discharged vapor stream at an acute angle away from said stem and thereby displace the vapor stream path away from the base of said stem, said head portion having a central thickened wall opposite the discharge end of said stem, the wall thickness decreasing from said central portion toward the vapor discharge orifice, the variation in wall thickness serving to maintain substantially uniform temperature distribution and to minimize formation of carbon deposits in the head portion.

14. A fuel vaporizer tube *assembly* adapted for use in a vaporizing type combustor, said tube including a hollow stem portion with an open end base, a head portion atop said stem and including a leg portion extending laterally from said head portion, said leg portion terminating in a vapor discharge orifice disposed at an acute angle to the axis of said stem portion, and operable to direct the path of a discharged vapor stream at an acute angle away from said stem and thereby displace the vapor stream path away from the base of said stem, the wall thickness of the head portion of the vapor tube being nonuniform, being thicker at the top opposite the stem discharge, and tapering to a thinner wall thickness at the discharge orifice, the thickened wall section serving to raise the temperature of the tube in that location.

15. A fuel vaporizer tube *assembly* as claimed in claim 14, the wall of said tube being thickened at the inner radius juncture of said stem with said leg, to eliminate a sharp reentrant curve to thereby decrease a tendency to build up carbon, and prevent a sharply concave external surface at the tube juncture.

16. A fuel vaporizer tube *assembly* as claimed in claim 14, wherein the interior of said vapor tube is smoothly flow contoured to eliminate eddies and flow losses therein, thereby tending to prevent formation of localized hot spots within said vapor tube.

17. A fuel vaporizer tube *assembly* as claimed in claim 15, wherein the interior of said vapor tube is smoothly flow contoured to eliminate eddies and flow losses therein, thereby tending to prevent formation of localized hot spots within said vapor tube.

18. A vaporizer tube *assembly* as claimed in claim 17 wherein the interior smoothly flow contoured configuration of the vaporizer tube interior is aerodynamically designed to substantially eliminate areas and angles tending to create disruption of flow therethrough.

19. A vaporizer tube *assembly* as claimed in claim 18, the cross-sectional area of said leg being smaller than the cross-sectional area of said stem.

20. A fuel vaporizer tube *assembly* as claimed in claim 1, wherein a said tube is operably mounted within an annular burner of a turbine, with the base of said stem operably mounted with respect to and through a head plate of the burner, *said plate being a splash plate*, said splash plate being operatively associated with and extending around said stem proximate the base thereof and positioned between said discharge orifice and head plate and being of such shape, size and configuration as to substantially intercept the discharged vapor stream to thereby reduce the total temperature spread in said head plate and shield said head plate from the hot vapor discharge.

21. A fuel vaporizer tube *assembly* as claimed in claim 20, wherein said splash plate is of a longitudinally curvilinear extended rectangular shape commensurate with the curvilinear shape of said annular burner and is uniformly spaced a small distance from the sidewalls thereof.

22. A fuel vaporizer *tube assembly* as claimed in claim 21, wherein said splash plate has rounded corners and a surrounding upturned peripheral edge thereon providing increased stiffness and serving to peripherally confine vapors from the discharge stream impinging thereon.

23. A fuel vaporizer *tube assembly* as claimed in claim 22, wherein a plurality of said vaporizer tubes are operably mounted in said burner in spaced relationship thereabout between the annular sidewalls thereof, the ends of said splash plates being spaced from one another a distance substantially equal to the spacing between the longitudinal edges of said splash plates and said sidewalls of said annular burner, the spacings being such as to substantially intercept the hot discharge vapor streams from said vaporizer tubes, thereby to effectively shield the entire head plate and to minimize heat effect on said head plate, the spacings being sufficiently small to prevent undesirable pressure drops in the burner.

24. A fuel vaporizer tube *assembly* as claimed in claim 20, further including a shroud positioned about said stems proximate the base thereof and in radially spaced relationship therewith, said shroud extending below and above said head plate, the spacing of said shroud and said stem providing an airflow channel therebetween adapted for compressed air introduction and partial flow for additive mixing with the vapor stream discharge from said tube, and cooling of said tube stem, said shroud having anti-carbon holes therethrough at a position substantially aligned with the shorter dimension of said splash plate for air flow therethrough to impinge the upper surface of the splash plate to air wash carbon particles therefrom.

*25. The fuel vaporizer tube assembly as set forth in claim 1 wherein said plate is a splash plate.*

*26. The fuel vaporizer tube assembly as set forth in claim 1 wherein said plate is a head plate.*

*27. The fuel vaporizer tube assembly as set forth in claim 1 wherein said plate serves to improve vaporization.*

*28. A continuous fuel vaporizer tube adapted for use in a vaporizing type combustor, said tube including a hollow stem portion with an open end base, a head portion atop said stem and including a hollow leg portion extending laterally from said head portion, the hollow interiors of said stem portions, said head portion, and said leg portion constituting a continuous closed duct with a smooth continuous flow path contour therethrough, said leg portion terminating in a vapor discharge orifice disposed at an acute angle to the axis of said stem portion, and operable to direct the path of a discharged vapor stream at an acute angle away from said stem and thereby displace the vapor stream path away from the base of said stem, said tube having a non-uniform wall thickness with resulting temperatures therein serving to prevent areas of carbon build up and localized hot spots.*

* * * * *